United States Patent [19]

Dittrich et al.

[11] Patent Number: 4,528,003
[45] Date of Patent: Jul. 9, 1985

[54] APPARATUS FOR SEPARATING GASEOUS HYDROGEN ISOTOPES

[75] Inventors: Hans Dittrich, Karlsruhe; Hartmut Frey, Esslingen, both of Fed. Rep. of Germany

[73] Assignee: Kernforschungszentrum Karlsruhe GmbH, Karlsruhe, Fed. Rep. of Germany

[21] Appl. No.: 505,401

[22] Filed: Jun. 17, 1983

[30] Foreign Application Priority Data

Jul. 9, 1982 [DE] Fed. Rep. of Germany ....... 3225751

[51] Int. Cl.³ .................. B01D 59/14; G21C 3/02
[52] U.S. Cl. ................................. 55/158; 55/16; 376/418
[58] Field of Search ............. 55/16, 158; 252/181.6; 376/417, 418, 455

[56] References Cited

U.S. PATENT DOCUMENTS

| 3,203,901 | 8/1965 | Porta | 252/181.6 |
|---|---|---|---|
| 3,428,476 | 2/1969 | Langley et al. | 55/16 X |
| 3,751,879 | 8/1973 | Allington | 55/158 |
| 3,969,185 | 7/1976 | Ross et al. | 376/418 |
| 4,065,352 | 12/1977 | Iwano et al. | 376/418 |
| 4,131,511 | 12/1978 | Mordarski et al. | 376/418 |
| 4,279,700 | 7/1981 | Boyle et al. | 376/418 |
| 4,328,768 | 5/1982 | Tracy et al. | 55/16 X |

FOREIGN PATENT DOCUMENTS

| 2449553 | 3/1975 | Fed. Rep. of Germany. |
|---|---|---|
| 2854682 | 6/1980 | Fed. Rep. of Germany. |
| 139098 | 12/1978 | Japan ..................... 376/418 |

Primary Examiner—Robert Spitzer
Attorney, Agent, or Firm—Sughrue, Mion, Zinn, Macpeak & Seas

[57] ABSTRACT

Apparatus for separating the gaseous hydrogen isotopes protium, deuterium and tritium from a gas stream containing one or a plurality of the hydrogen isotopes. A membrane is provided which is permeable to the hydrogen isotopes and impermeable to the gas stream. The membrane has a side facing away from the gas stream and a side exposed to the gas stream. On the side of the membrane facing away from the gas stream, there is disposed a getter which takes up the hydrogen isotopes by absorption at a predetermined absorption temperature and releases the absorbed hydrogen isotopes again by desorption at a desorption temperature above the absorption temperature. The membrane permeable to the hydrogen isotopes covers a surface of the getter so that the getter, at the absorption temperature, absorbs hydrogen isotopes exclusively through the membrane. The membrane and getter constitute an absorption element and are permanently connected to one another.

8 Claims, 2 Drawing Figures

APPARATUS FOR SEPARATING GASEOUS HYDROGEN ISOTOPES

BACKGROUND OF THE INVENTION

The present invention relates to an apparatus for separating the gaseous hydrogen isotopes protium, deuterium and tritium from a gas or gas mixture containing one or a plurality of the hydrogen isotopes.

The separation of hydrogen isotopes from gas mixtures is necessary, in particular, in coolant circuits of gas cooled high temperature reactors and in fuel circuits of fusion reactors. In addition to their separation, the recovery of the hydrogen isotopes for their further use is also of significance.

An apparatus is disclosed in DE-OS No. 2,854,682 for separating hydrogen isotopes from a gas mixture wherein a membrane wall is provided which is permeable for hydrogen isotopes. The apparatus comprises an inner chamber and an outer chamber separated from one another by a wall which is preferably permeable for atomic hydrogen and only slightly permeable for molecular hydrogen. One chamber is connected with a gas inlet line for the hydrogen isotope mixture which is to be separated and with a gas discharge line. The other chamber collects the isotope mixture which passes through the permeable wall. A device for converting molecular hydrogen to atomic hydrogen is disposed in the chamber connected with the gas inlet and gas discharge lines so as to separate the isotopes contained in the hydrogen isotope mixture.

Furthermore, DE-OS No. 2,449,553 and corresponding U.S. Pat. No. 3,969,185, disclose a composite getter which essentially includes as the getter material zirconium or zirconium alloys with niobium, titanium, nickel and yttrium. The composite getter can be used to getter hydrogen and its isotopes. The composite getter is comprised of a metallic substrate having thereon a coating of a material capable of gettering reactive gases covering at least a portion of the substrate, with the substrate having a greater thermal coefficient of expansion than the coating and being capable of producing tensile stress in the coating whereby the coating is intermittently fractured by changes in temperature of the composite getter to thereby expose fresh gettering surfaces in the coating.

SUMMARY OF THE INVENTION

It is an object of the present invention to provide an apparatus which allows the easy separation of hydrogen isotopes contained in a gas mixture and enables them to be recovered without substantial expenditures.

Additional objects and advantages of the present invention will be set forth in part in the description which follows and in part will be obvious from the description or can be learned by practice of the invention. The objects and advantages are achieved by means of the apparatus, instrumentalities and combinations particularly pointed out in the appended claims.

To achieve the foregoing objects and in accordance with its purpose, the present invention provides an apparatus for separating the gaseous hydrogen isotopes protium, deuterium and tritium from a gas stream containing one or a plurality of the hydrogen isotopes: comprising (a) a membrane which is permeable to the hydrogen isotopes and impermeable to the gas stream, the membrane having a side facing away from the gas stream and a side which is exposed to the gas stream; (b) a getter disposed on the side of the membrane facing away from the gas stream, the getter being made of a material which takes up the hydrogen isotopes by absorption at a predetermined absorption temperature and releases the absorbed hydrogen isotopes by desorption at a desorption temperature above the absorption temperature; (c) the membrane permeable to the hydrogen isotopes covers a surface of the getter so that the getter, at the absorption temperature, absorbs hydrogen isotopes exclusively through the membrane; and (d) the membrane and getter constitute an absorption element and are permanently connected to one another.

In one preferred embodiment of the present invention, the absorption element is permanently connected with a band-shaped carrier which does not participate in the absorption and desorption. Preferably, the carrier is made of a high-grade steel.

In another embodiment of the present invention, the absorption element is a sphere having a diameter smaller than 3 mm, and the sphere comprises a getter whose surface is permanently connected to a membrane completely enclosing the sphere. A plurality of such spherical absorption elements can be continuosly conducted through the gas stream and thus absorb hydrogen isotopes which can thereafter be desorbed outside the gas stream.

The material employed for the getter preferably is titanium, zirconium, hafnium or a zirconium-aluminum alloy. The material employed for the membrane preferably is niobium, titanium, palladium, ceramic or metal ceramic.

The advantages realized with the apparatus of the present invention are, in particular, that with the direct placement (arrangement) of the membrane on the surface of the getter, it is possible in a simple manner to produce a membrane thickness in the micron range and thus enhance the selective absorption and desorption of the hydrogen isotopes and to allow the use of absorption elements which are able to move freely in the gas stream.

It is to be understood that both the foregoing general description and the following detailed description are exemplary and explanatory, but are not restrictive of the invention.

DETAILED DESCRIPTION OF THE INVENTION

Figure 1:
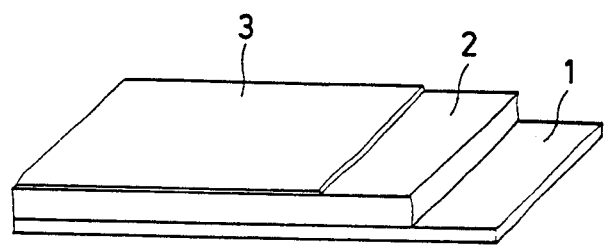
FIG. 1 shows an arrangement of the absorption element on a band-shaped carrier in accordance with one embodiment of the apparatus of the present invention.

Referring now to the drawings, FIG. 1 shows one embodiment of an apparatus made in accordance with the present invention, and comprising a band-shaped carrier 1 of high-grade steel of a width of 25 mm and a thickness of 0.2 mm, onto which is applied to a thickness of about 0.5 mm a coating of a zirconium-aluminum alloy to serve as getter 2. Instead of the zirconium-aluminum alloy, any other material suitable for gettering the hydrogen isotopes can be employed, such as, for example, titanium, zirconium or hafnium.

The surface of getter 2 facing away from carrier 1 is covered, generally completely, with a membrane 3 which is permeable to hydrogen isotopes and has a thickness lower than 10 μm. Membrane 3 is made of one of the materials niobium, titanium, palladium, ceramic or metal ceramic. By providing this membrane coating 3, it is not only prevented that other components of the gas mixture containing the hydrogen isotopes are absorbed by the getter material, which would result in a reduction of the absorption capability for the hydrogen isotopes, but this membrane 3 is what permits the clear separation of the hydrogen isotopes from the gas mixture. The apparatus selectively absorbs hydrogen isotopes in their gaseous phase down to very low partial pressures of about $10^{-11}$ mbar at an absorption temperature of about 300° C. By simply heating the apparatus to a desorption temperature of about 600° C., the hydrogen isotopes are released again.

The application of the getter material onto carrier 1 and the application of membrane 3 onto the getter material can be effected in one process phase, e.g. by ion beam coating.

Figure 2:
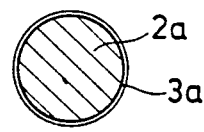
FIG. 2 shows a spherical absorption element in accordance with a second embodiment of the apparatus of the present invention.

Another embodiment of the apparatus according to the present invention is shown in the sectional view of FIG. 2. A getter 2a is here shaped into a sphere having a diameter of approximately 1 mm, and the surface of this sphere is completely covered with a membrane 3a that is permeable to hydrogen isotopes. The materials employed for getter 2a and membrane 3a correspond, respectively to those which can be employed for the getter 2 and membrane 3 illustrated in FIG. 1.

The getter 2a and the membrane 3a thus form a spherical absorption element having a diameter of approximately 1 mm. It is possible, for example, to arrange a pile of a plurality of such absorption elements in a gas stream containing the hydrogen isotopes and, after a predetermined period of dwell, heat each one of these spheres to desorption temperature outside the gas stream and reintroduce it back into the gas stream after desorption of the hydrogen isotopes.

It will be understood that the above description of the present invention is susceptible to various modifications, changes and adaptations, and the same are intended to be comprehended within the meaning and range of equivalents of the appended claims.

What is claimed is:

1. Apparatus for separating the gaseous hydrogen isotopes protium, deuterium and tritium from a gas stream containing one or a plurality of said hydrogen isotopes and for desorbing the separated hydrogen isotopes comprising:
   (a) a membrane having a thickness less than 10 micrometers which is permeable to the hydrogen isotopes and impermeable to the gas stream, the membrane having a side facing away from the gas stream and a side which is exposed to the gas stream;
   (b) a getter disposed on the side of the membrane facing away from the gas stream, the getter being made of material which takes up the hydrogen isotopes by absorption at a predetermined absorption temperature and releases the absorbed hydrogen isotopes by desorption at a desorption temperature above the absorption temperature;
   (c) the membrane permeable to the hydrogen isotopes covers a surface of the getter so that the getter, at the absorption temperature, absorbs hydrogen isotopes exclusively through said membrane; and
   (d) membrane and getter constitute an absorption element and are permanently connected to one another.

2. Apparatus as defined in claim 1, wherein the absorption element is permanently connected with a band-shaped carrier which does not participate in the absorption and desorption.

3. Apparatus as defined in claim 2, wherein the carrier is made of a high-grade steel.

4. Apparatus as defined in claim 1, wherein the absorption element is a sphere having a small diameter, and said sphere comprises the getter which is permanently connected to the membrane, with the membrane completely enclosing said sphere.

5. Apparatus as defined in claim 4, wherein the sphere has a diameter of about 1 mm.

6. Apparatus as defined in claim 1, wherein the material employed for the getter is titanium, zirconium, hafnium or a zirconium-aluminum alloy.

7. Apparatus as defined in claim 1, wherein the material employed for the membrane is niobium, titanium, palladium, ceramic or metal ceramic.

8. Apparatus as defined in claim 1, wherein the membrane is palladium.

* * * * *